(12) United States Patent
Autry et al.

(10) Patent No.: US 12,070,915 B2
(45) Date of Patent: Aug. 27, 2024

(54) AUTOCLAVE SYSTEM, BLADDER ASSEMBLY, AND ASSOCIATED METHOD FOR FORMING A PART

(71) Applicant: The Boeing Company, Chicago, IL (US)

(72) Inventors: Byron J. Autry, Charleston, SC (US); William H. Ingram, Puyallup, WA (US); Karl M. Nelson, Issaquah, WA (US)

(73) Assignee: The Boeing Company, Arlington, VA (US)

( * ) Notice: Subject to any disclaimer, the term of this patent is extended or adjusted under 35 U.S.C. 154(b) by 3 days.

(21) Appl. No.: 17/556,688

(22) Filed: Dec. 20, 2021

(65) Prior Publication Data

US 2022/0212425 A1 Jul. 7, 2022

Related U.S. Application Data

(60) Provisional application No. 63/133,667, filed on Jan. 4, 2021.

(51) Int. Cl.
*B29C 70/54* (2006.01)
*B29C 70/44* (2006.01)
(Continued)

(52) U.S. Cl.
CPC .............. *B29C 70/54* (2013.01); *B29C 70/44* (2013.01); *B29K 2063/00* (2013.01); *B29K 2307/04* (2013.01); *B29K 2309/08* (2013.01)

(58) Field of Classification Search
CPC ... B29C 70/443; B29C 70/446; B29C 70/544; B29C 70/382; B29C 70/386;
(Continued)

(56) References Cited

U.S. PATENT DOCUMENTS

| | | |
|---|---|---|
| 2,713,702 A | 7/1955 | Jewell |
| 3,150,935 A | 9/1964 | Matteson |
| (Continued) | | |

FOREIGN PATENT DOCUMENTS

| | | |
|---|---|---|
| DE | 3226220 | 1/1984 |
| EP | 2497623 | 9/2012 |

OTHER PUBLICATIONS

Anderson, J.P. & Altan, M., 2014 (accessed Oct. 11, 2023). Bladder Assisted Composite Manufacturing (BACM): Challenges and Opportunities. 10.13140/2.1.2139.6169. (Year: 2014).*

(Continued)

*Primary Examiner* — Philip C Tucker
*Assistant Examiner* — Andrew L Swanson
(74) *Attorney, Agent, or Firm* — Kunzler Bean & Adamson

(57) ABSTRACT

Disclosed herein is a bladder assembly for forming a part made of a fiber-reinforced polymeric material. The bladder assembly comprises a bladder comprising an interior having a hollow interior channel within the interior of the bladder. The bladder assembly also comprises an intake port fluidically coupled with the interior of the bladder and an exhaust port fluidically coupled with the interior of the bladder. The bladder assembly further comprises a pressure control device fluidically coupled with the exhaust port and configured to control a pressure drop across the interior of the bladder from the intake port to the exhaust port.

20 Claims, 8 Drawing Sheets

(51) Int. Cl.
  *B29K 63/00*       (2006.01)
  *B29K 307/04*      (2006.01)
  *B29K 309/08*      (2006.01)

(58) Field of Classification Search
  CPC ..... B29C 70/342; B29C 70/347; B29C 70/00;
    B29C 70/54; B29C 70/44; B29C 43/10;
    B29C 43/12; B29C 43/32; B29C
    2043/3205; B29C 2043/3216; B29C
    2043/3222–3233; B29C 2043/3238–3244;
    B29C 43/52; B29C 2043/522–527
  See application file for complete search history.

(56) References Cited

U.S. PATENT DOCUMENTS

| | | | |
|---|---|---|---|
| 4,532,984 A | 8/1985 | Smith | |
| 5,013,514 A * | 5/1991 | Azzani | B29C 33/448 |
| | | | 264/258 |
| 5,266,249 A * | 11/1993 | Grimes, III | B29C 70/44 |
| | | | 428/116 |
| 6,673,277 B1 | 1/2004 | Joseph et al. | |
| 7,278,198 B2 | 10/2007 | Olson et al. | |
| 7,527,222 B2 | 5/2009 | Biornstad et al. | |
| 8,382,037 B2 | 2/2013 | Biornstad et al. | |
| 9,039,858 B2 | 5/2015 | Dull et al. | |
| 9,523,431 B2 | 12/2016 | Dull | |
| 2009/0155403 A1 | 6/2009 | Busch et al. | |
| 2009/0243160 A1* | 10/2009 | Chiang | B29C 70/86 |
| | | | 264/523 |
| 2012/0003597 A1 | 1/2012 | Mason | |
| 2012/0235336 A1* | 9/2012 | Sana | B29C 43/3642 |
| | | | 269/47 |
| 2012/0312848 A1* | 12/2012 | Delusky | B60R 9/04 |
| | | | 156/149 |
| 2013/0161850 A1* | 6/2013 | Harris | B29C 70/44 |
| | | | 425/149 |
| 2013/0313760 A1 | 11/2013 | Kondo et al. | |
| 2017/0334095 A1* | 11/2017 | Harshberger | B29C 70/44 |
| 2019/0039333 A1* | 2/2019 | Mehling | B29C 70/44 |
| 2019/0091952 A1 | 3/2019 | Nelson et al. | |
| 2021/0206029 A1 | 7/2021 | Streeter et al. | |

OTHER PUBLICATIONS

Dynamic Boosting Systems, Steam Compressor/Energy Recovery, https://dynamicboost.com/steam-compressors, accessed Dec. 13, 2019.
European Search Report for EP Patent Application No. 21217350.4 dated Jun. 17, 2022.

* cited by examiner

AUTOCLAVE SYSTEM, BLADDER ASSEMBLY, AND ASSOCIATED METHOD FOR FORMING A PART

FIELD

This disclosure relates generally to forming composite parts, and more particularly to forming composite parts using an autoclave and a flexible bladder.

BACKGROUND

Autoclaves provide the heat and pressure necessary to cure composite parts made of curable materials, such as fiber-reinforced polymer materials including catalyzing resins (e.g., epoxies or polyesters). For certain parts with complex shapes, heating some portions of the part, such as internally situated portions, using an autoclave can be difficult due to one or more factors, such as the mass of the part, variable thickness of the part, or variable thickness of the tooling used to form the part. These factors can cause uneven heating of the part, which can lead to lagging temperature gradients in the part, uneven curing of the part, and prolonged cure cycle times. Accordingly, more uniformly and quickly distributing heat to the part during a curing operation in an autoclave is desired.

SUMMARY

The subject matter of the present application provides examples of an autoclave system, a bladder assembly, and a method of forming parts that overcome the above-discussed shortcomings of prior art techniques. Accordingly, the subject matter of the present application has been developed in response to the present state of the art, and in particular, in response to shortcomings of conventional autoclave systems and methods of curing parts.

Disclosed herein is a bladder assembly for forming a part made of a fiber-reinforced polymeric material. The bladder assembly comprises a bladder comprising an interior having a hollow interior channel within the interior of the bladder. The bladder assembly also comprises an intake port fluidically coupled with the interior of the bladder and an exhaust port fluidically coupled with the interior of the bladder. The bladder assembly further comprises a pressure control device fluidically coupled with the exhaust port and configured to control a pressure drop across the interior of the bladder from the intake port to the exhaust port. The preceding subject matter of this paragraph characterizes example 1 of the present disclosure.

The bladder comprises a first end portion and a second end portion. The first end portion and the second end portion define opposite ends of the hollow interior channel. The bladder assembly further comprises an intake plug fixed to the first end portion of the bladder. The intake port passes through the intake plug. The bladder assembly further comprises an exhaust plug fixed to the second end portion of the bladder. The exhaust port passes through the exhaust plug. The preceding subject matter of this paragraph characterizes example 2 of the present disclosure, wherein example 2 also includes the subject matter according to example 1, above.

The intake port is fluidically coupled with the hollow interior channel of the interior of the bladder. The exhaust port is fluidically coupled with the hollow interior channel of the interior of the bladder. The preceding subject matter of this paragraph characterizes example 3 of the present disclosure, wherein example 3 also includes the subject matter according to example 2, above.

The bladder comprises at least an outer layer and an inner layer. The inner layer defines the hollow interior channel. The interior of the bladder has a fluid flow conduit interposed between the outer layer and the inner layer and extending from the first end portion of the bladder to the second end portion of the bladder. The intake port is fluidically coupled with the fluid flow conduit. The exhaust port is fluidically coupled with the fluid flow conduit. The preceding subject matter of this paragraph characterizes example 4 of the present disclosure, wherein example 4 also includes the subject matter according to any one of examples 2 or 3, above.

The interior of the bladder has a plurality of fluid flow conduits, spaced apart from each other. The intake port is fluidically coupled with the plurality of fluid flow conduits. The exhaust port is fluidically coupled with the plurality of fluid flow conduits. The preceding subject matter of this paragraph characterizes example 5 of the present disclosure, wherein example 5 also includes the subject matter according to example 4, above.

The bladder comprises a first end portion and a second end portion. The first end portion and the second end portion define opposite ends of the hollow interior channel. The bladder assembly further comprises an intake plug fixed to the first end portion of the bladder. The second end portion is closed. The intake port passes through the intake plug. The exhaust port passes through the intake plug. The preceding subject matter of this paragraph characterizes example 6 of the present disclosure, wherein example 6 also includes the subject matter according to example 1, above.

The bladder assembly further comprises a tube passing through the hollow interior channel from the first end portion of the bladder toward the second end portion of the bladder. The tube is fluidically coupled with the intake port at the first end portion of the bladder and open to the hollow interior channel proximate the second end portion of the bladder. The preceding subject matter of this paragraph characterizes example 7 of the present disclosure, wherein example 7 also includes the subject matter according to example 6, above.

The bladder comprises at least an outer layer and an inner layer. The inner layer defines the hollow interior channel. The interior of the bladder has a fluid flow conduit interposed between the outer layer and the inner layer and extending from the first end portion of the bladder to the second end portion of the bladder. The interior of the bladder has a second fluid flow conduit interposed between the outer layer and the inner layer and extending from the second end portion of the bladder to the first end portion of the bladder. The fluid flow conduit and the second fluid flow conduit are fluidically coupled at the second end portion of the bladder. The intake port is fluidically coupled with the fluid flow conduit. The exhaust port is fluidically coupled with the second fluid flow conduit. The preceding subject matter of this paragraph characterizes example 8 of the present disclosure, wherein example 8 also includes the subject matter according to example 6, above.

The fluid flow conduit extends along a first side of the bladder. The second fluid flow conduit extends along a second side of the bladder. The first side is opposite the second side. The preceding subject matter of this paragraph characterizes example 9 of the present disclosure, wherein example 9 also includes the subject matter according to example 8, above.

The interior of the bladder has a plurality of fluid flow conduits, spaced apart from each other. The interior of the bladder has a plurality of second fluid flow conduits, spaced apart from each other. Each one of the plurality of fluid flow conduits is fluidically coupled to a corresponding one of the plurality of second fluid flow conduits at the second end portion of the bladder. The intake port is fluidically coupled with the plurality of fluid flow conduits. The exhaust port is fluidically coupled with the plurality of second fluid flow conduits. The preceding subject matter of this paragraph characterizes example 10 of the present disclosure, wherein example 10 also includes the subject matter according to any one of examples 8 or 9, above.

The pressure control device is configured to passively control the pressure drop across the interior of the bladder. The preceding subject matter of this paragraph characterizes example 11 of the present disclosure, wherein example 11 also includes the subject matter according to any one of examples 1-10, above.

The pressure control device is configured to actively control the pressure drop across the interior of the bladder. The preceding subject matter of this paragraph characterizes example 12 of the present disclosure, wherein example 12 also includes the subject matter according to any one of examples 1-10, above.

The bladder assembly further comprises a pressure sensor fluidically coupled with the exhaust port between the exhaust port and the pressure control device. The pressure control device is operably coupled with the pressure sensor. The pressure control device is actuatable in response to feedback from the pressure sensor. The preceding subject matter of this paragraph characterizes example 13 of the present disclosure, wherein example 13 also includes the subject matter according to example 12, above.

The pressure control device is further configured to limit the pressure drop across the interior to less than or equal to a pressure-drop percentage threshold. The preceding subject matter of this paragraph characterizes example 14 of the present disclosure, wherein example 14 also includes the subject matter according to any one of examples 1-13, above.

The pressure-drop percentage threshold is 5%. The preceding subject matter of this paragraph characterizes example 15 of the present disclosure, wherein example 15 also includes the subject matter according to example 14, above.

Also disclosed herein is a system for forming a part made of fiber-reinforced polymeric material. The system comprises an autoclave vessel defining an interior cavity and containing a fluid. The system also comprises a bladder assembly at least partially in the interior cavity of the autoclave vessel. The bladder assembly comprises a bladder comprising an interior through which the fluid is flowable and having a hollow interior channel within the interior of the bladder, an intake port fluidically coupled with the interior of the bladder and open to the interior cavity of the autoclave vessel, an exhaust port fluidically coupled with the interior of the bladder and open to an exterior outside the interior cavity of the autoclave vessel, and a pressure control device fluidically coupled with the exhaust port and configured to control a pressure drop across the interior of the bladder from the intake port to the exhaust port by regulating a flow of the fluid from the interior of the bladder to the exterior. The preceding subject matter of this paragraph characterizes example 16 of the present disclosure.

The fluid within the interior cavity of the autoclave vessel has a first pressure, the fluid within interior of the bladder has a second pressure lower than the first pressure, and the fluid in the exterior has a third pressure lower than the second pressure. The preceding subject matter of this paragraph characterizes example 17 of the present disclosure, wherein example 17 also includes the subject matter according to example 16, above.

The system further comprises a controller operably coupled with the pressure control device. The controller is configured to compare the second pressure to the first pressure to provide a comparison between the second pressure and the first pressure. The controller is also configured to control actuation of the pressure control device in response to the comparison between the second pressure and the first pressure. The preceding subject matter of this paragraph characterizes example 18 of the present disclosure, wherein example 18 also includes the subject matter according to any one of examples 16 or 17, above.

The part comprises a stringer-skin assembly comprising a stringer and a skin. The bladder is interposed between the stringer and the skin. The preceding subject matter of this paragraph characterizes example 19 of the present disclosure, wherein example 19 also includes the subject matter according to any one of examples 16-18, above.

The system further comprises a first tool and a second tool between which the bladder is interposed. The first tool has a multi-part construction and comprises a first portion and a second portion. The first portion is adjoined to the second portion along a seam. The bladder is located at the seam such that the bladder is interposed between the seam and the second tool. The preceding subject matter of this paragraph characterizes example 20 of the present disclosure, wherein example 20 also includes the subject matter according to any one of examples 16-19, above.

Additionally disclosed herein is a method of forming a part made of fiber-reinforced polymeric material, the method comprises positioning a bladder, comprising an interior having a hollow interior channel, within an interior space of the part, and positioning the part and the bladder within an interior cavity of an autoclave vessel. The method also comprise, while in the interior cavity of the autoclave vessel, shaping the interior space of the part with the bladder. The method further comprises, while shaping the interior space of the part with the bladder, creating a pressure drop across the interior of the bladder, with a pressure control device fluidically coupled with the interior of the bladder and an exterior outside the autoclave vessel to induce flow of a fluid, contained within the autoclave vessel through the interior of the bladder and from the interior of the bladder to the exterior outside the autoclave vessel. The preceding subject matter of this paragraph characterizes example 21 of the present disclosure.

The fluid flows into the interior of the bladder from the first end portion of the bladder and flows out of the interior of the bladder to the exterior outside the autoclave vessel from the second end portion of the bladder. The preceding subject matter of this paragraph characterizes example 22 of the present disclosure, wherein example 22 also includes the subject matter according to example 21, above.

The fluid flows into the interior of the bladder from the first end portion of the bladder and flows out of the interior of the bladder to the exterior outside the autoclave vessel from the first end portion of the bladder. The preceding subject matter of this paragraph characterizes example 23 of the present disclosure, wherein example 23 also includes the subject matter according to example 21, above.

The fluid flows through the interior of the bladder in a first direction from the first end portion of the bladder to the second end portion of the bladder and in a second direction, opposite the first direction, from the second end portion of the bladder to the first end portion of the bladder. The preceding subject matter of this paragraph characterizes example 24 of the present disclosure, wherein example 24 also includes the subject matter according to example 23, above.

The fluid flows through the interior of the bladder between an inner layer of the bladder and an outer layer of the bladder. The preceding subject matter of this paragraph characterizes example 25 of the present disclosure, wherein example 25 also includes the subject matter according to any one of examples 21-24, above.

The method further comprises comparing the first pressure of the fluid within the autoclave vessel to the second pressure of the fluid within the interior of the bladder to provide a comparison between the first pressure and the second pressure. The method also comprises controlling actuation of the pressure control device, to control the pressure drop across the interior of the bladder, in response to the comparison between the first pressure and the second pressure. The preceding subject matter of this paragraph characterizes example 26 of the present disclosure, wherein example 26 also includes the subject matter according to any one of examples 21-25, above.

The described features, structures, advantages, and/or characteristics of the subject matter of the present disclosure may be combined in any suitable manner in one or more examples, including embodiments and/or implementations. In the following description, numerous specific details are provided to impart a thorough understanding of examples of the subject matter of the present disclosure. One skilled in the relevant art will recognize that the subject matter of the present disclosure may be practiced without one or more of the specific features, details, components, materials, and/or methods of a particular example, embodiment, or implementation. In other instances, additional features and advantages may be recognized in certain examples, embodiments, and/or implementations that may not be present in all examples, embodiments, or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

BRIEF DESCRIPTION OF THE DRAWINGS

In order that the advantages of the subject matter may be more readily understood, a more particular description of the subject matter briefly described above will be rendered by reference to specific examples that are illustrated in the appended drawings. Understanding that these drawings depict only typical examples of the subject matter, they are not therefore to be considered to be limiting of its scope. The subject matter will be described and explained with additional specificity and detail through the use of the drawings, in which.

DETAILED DESCRIPTION

Reference throughout this specification to "one example," "an example," or similar language means that a particular feature, structure, or characteristic described in connection with the example is included in at least one example of the present disclosure. Appearances of the phrases "in one example," "in an example," and similar language throughout this specification may, but do not necessarily, all refer to the same example. Similarly, the use of the term "implementation" means an implementation having a particular feature, structure, or characteristic described in connection with one or more examples of the present disclosure, however, absent an express correlation to indicate otherwise, an implementation may be associated with one or more examples.

Disclosed herein are various examples of a bladder and bladder assembly that, when used in conjunction with an autoclave, promote uniform heating and curing of parts made of fiber-reinforced polymeric material. The bladder assembly of the present disclosure enables the flow of heated fluid through the bladder, which helps to reduce lagging temperature gradients in parts being cured. A reduction in lagging temperature gradients in parts helps improve cure cycle times. Additionally, enabling the flow of heated fluid through the bladder promotes an accelerated cure in thicker portions of variable-thickness parts.

Figure 1A:
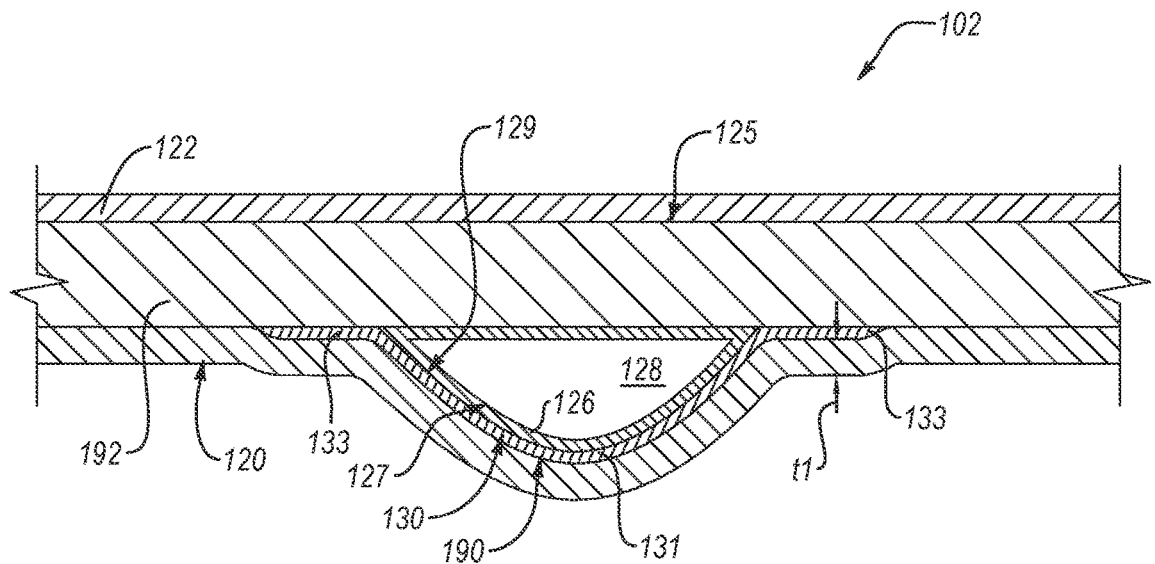
FIG. 1A is a schematic, cross-sectional, front elevation view of a part manufacturing assembly, according to one or more examples of the present disclosure.

Referring to FIG. 1A, according to one example, a tooling assembly 102 for forming a part 190 includes a first tool 120 and a second tool 122. The first tool 120 and the second tool 122 are configured to secure a part 190, to be made, between the first tool 120 and the second tool 122. In some examples, the first tool 120 is shaped to define a desired shape of one exterior side of the part 190 and the second tool 122 is shaped to define a desired shape of an opposite side of the part 190. The first tool 120 and the second tool 122 are made from a stiff, heat-resistant, and thermally conductive material, such as a metal (e.g., Invar) or composite material. The part 190 includes at least two portions that are coupled together to form the part 190. Moreover, the part 190 further includes an interior space 129 that defines an interior surface of the part 190. The interior space 129 is defined between the at least two portions of the part 190.

The tooling assembly 102 also includes a bladder 126 positioned within the interior space 129 of the part 190 while the part 190 is formed. The bladder 126 is shaped to define a desired shape of the interior surface of the part 190. Accordingly, the bladder 126 can have any of various cross-sectional shapes. In the illustrated example, the bladder 126 has a trapezoidal-type cross-sectional shape. However, in other examples, the bladder 126 has another cross-sectional shape, such as square, triangular, circular, ovular, polygonal, and the like. The bladder 126 includes an interior 127, which includes a hollow interior channel 128 that extends a length of the bladder 126 or into the page in FIG. 1A. In some examples, a wall defining the bladder 126 has a constant thickness, such that the hollow interior channel 128 has a cross-sectional shape corresponding with the cross-sectional shape of the bladder 126. In certain examples, the bladder 126 is made of an elastomeric material (e.g. a material exhibiting elastic or rubber-like properties). Accordingly, the bladder 126 is more flexible than the first tool 120 and the second tool 122. The elastic and flexible nature of the bladder 126 allows the bladder 126 to expand when pressurized and contract with the pressure is removed, which helps to cure the part 190. Additionally, the elastic and flexible nature of the bladder 126 enables the bladder 126 to be removed from within the interior space 129 after the part 190 is cured. In certain examples, the elastomeric material of the bladder 126 has a hardness of between 50 Shore D and 80 Shore D on the durometer scale. The bladder 126 can also be reinforced with fibers, such as fiberglass.

Although the part 190 can be any of various parts, for use with any of various stationary or mobile structures, in the illustrated example, the part 190 is a stringer-skin assembly 125 of an aircraft. More specifically, in the illustrated example, the at least two portions of the part 190 include a stringer 130 and a skin 192. The skin 192 forms part of the fuselage of the aircraft. The stringer 130 is coupled to an interior side of the skin 192 and helps strengthen the skin 192. In the illustrated example, the stringer 130 is a hat stringer (e.g., a rounded hat stringer) that includes a hat portion 131 and opposing flange portions 133 extending from the hat portion 131. The flange portions 133 are affixed directly to the skin 192 such that the interior space 129 of the part 190 is defined as the hollow space between the hat portion 131 of the stringer 130 and the skin 192. As shown in FIG. 1A, the stringer 130 and the skin 192 extend lengthwise into the page with the skin 192 also extending circumferentially about an axis parallel to the longitudinal direction of the stringer 130 and the skin 192.

The part 190 is made of fiber-reinforced polymeric material in some examples. The fibers of the fiber-reinforced polymeric material can be continuous fibers made of carbon. According to other examples, the fibers of the fiber-reinforced polymeric material can be made of a material other than carbon, such as glass, and can be continuous or non-continuous. In certain examples, the polymeric material of the fiber-reinforced polymeric material is an epoxy or resin, which in some implementations, is a thermoset or thermoplastic polymeric material (e.g., epoxy or resin). Each one of the at least two portions of the part 190 (e.g., the stringer 130 and the skin 192) can be a laminated sheet of multiple layers or plies of a fiber-reinforced polymeric material.

The at least two portions of the part 190 are joined together via a bonding together of the polymeric materials of the two portions. Generally, the bonding process includes intermixing the polymeric materials of the at least two portions when in a flowable state and then hardening the polymeric materials to complete the bond. In certain examples where the polymeric materials are thermoset polymeric materials, the part 190 can be laid up with the polymeric materials in an uncured state and then heated at or above a cure temperature of the polymeric materials to cure (e.g., harden) together the polymeric materials. Prior to curing the part 190, the polymeric materials are in a pliable, malleable, or deformable state. Accordingly, the rigidity of the first tool 120, the second tool 122, and bladder 126, relative to the uncured part 190, help to maintain a shape of the portions of the part 190 and keep the portions of the part 190 together prior to and during curing (e.g., hardening) of the polymeric materials.

Figure 1B:
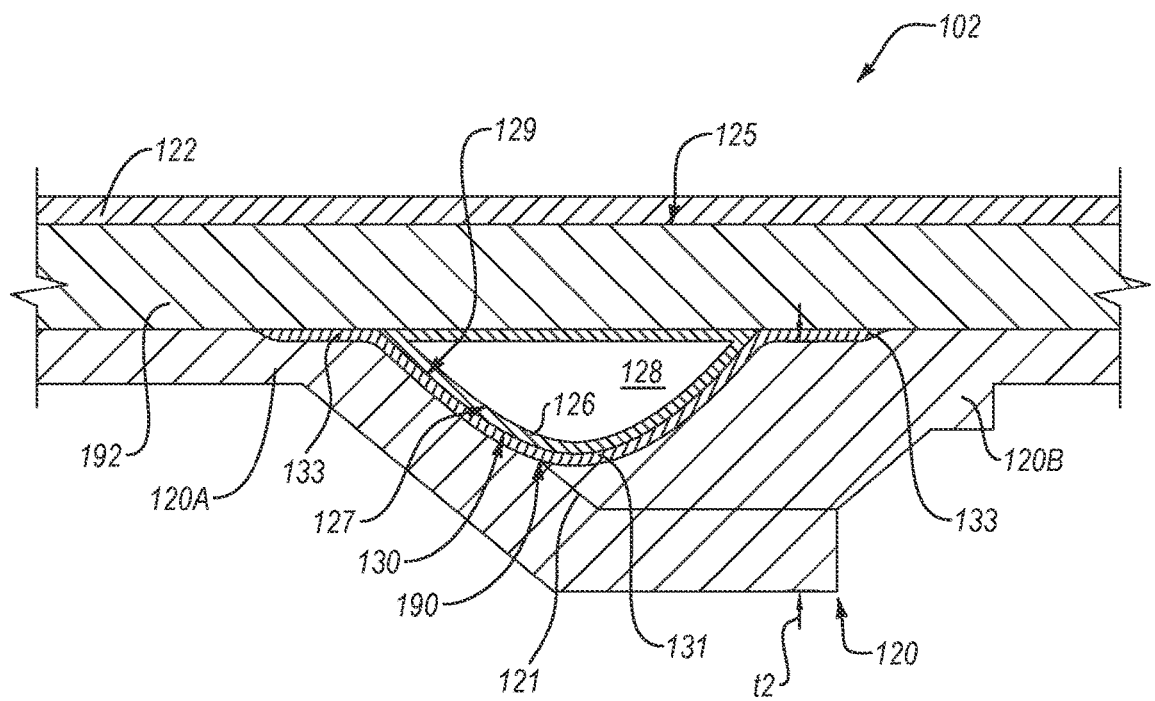
FIG. 1B is a schematic, cross-sectional, front elevation view of a part manufacturing assembly, according to one or more examples of the present disclosure.

In some examples, the first tool 120 is a mandrel or inside mold line tool and the second tool 122 is a caul sheet. The mandrel can be a one-piece or seamless mandrel (e.g., seamless at the stringer 130) as shown in FIG. 1A (e.g., having a one-piece construction) or a multi-part mandrel with a seam 121 (e.g., having a multi-part construction), between two adjoined portions 120A-120B of the mandrel, at the stringer 130 as shown in FIG. 1B. In certain examples, such as shown in FIG. 1B, the bladder 126 is located at the seam 121 between the two adjoined portions 120A-120B of the mandrel. In other words, the bladder 126 extends widthwise from one portion 120A of the mandrel, across the seam 121 between the adjoined portions 120A-120B, to the other portion 120B of the mandrel. Put another way, the bladder 126 is interposed between the seam 121 and the second tool 122.

A caul sheet is relatively thin compared to the mandrel. For a part 190 to be cured, heat is transferred to the part 190 through the first tool 120, the second tool 122, and the bladder 126. Because the caul sheet is thin, heat transfer through the second tool 122 may be efficient enough to heat a portion of the part 190 relatively quickly. However, because the mandrel is thicker than the caul sheet, heat transfer through the first tool 120 may be less efficient, thus slowing the heating of other portions of the part 190 and thus slowing the cure process of the part 190 or creating lagging temperature gradients in the part 190. Alternatively, the part 190 may have a variable thickness that tends to slow the cure process in such thicker portions of the part 190.

Moreover, the mandrel can include heat transfer restrictions in some examples that further slow the transfer of heat through the first tool 120 to the part 190. For example, as shown in FIG. 1B, the first tool 120 is a mandrel with a localized thickness increase, such as due to the added robustness of the mandrel at the seam of two adjoining parts of the mandrel. In other words, the first tool 120 of FIG. 1B has a thickness t2 proximate the stringer 130 that is greater than a thickness t1 of the first tool 120 of FIG. 1A at a location proximate the stringer 130. The thickness t2, being greater than the thickness t1, increases the thermal mass of the first tool 120 of FIG. 1B proximate the stringer 130 compared to the first tool 120 of FIG. 1A. The increased thermal mass requires more time to reach curing temperatures compared to surrounding portions of the first tool 120. Accordingly, the increased thermal mass of the first tool 120 of FIG. 1B has a tendency to cause lagging temperature gradients in the part 190, which may result in increased cure cycle times. As is described in more detail below, the bladder 126 is part of bladder assembly 124, and the bladder assembly 124 enables the flow of heated fluid through the bladder 126, which helps to reduce lagging temperature gradients in the part 190.

Figure 2:
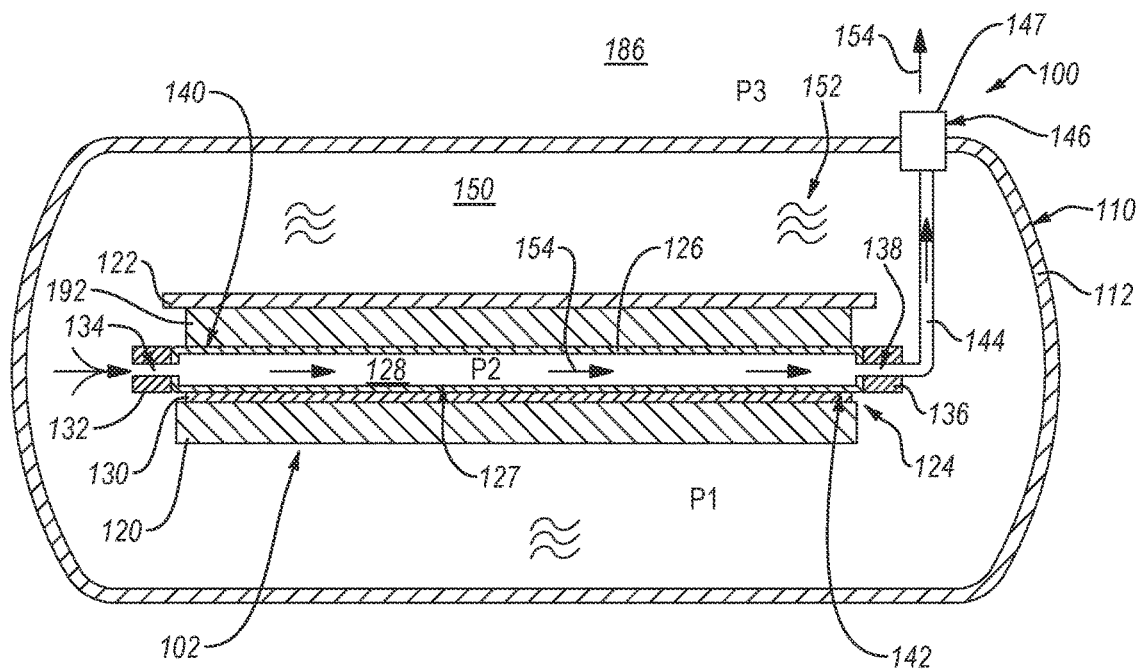
FIG. 2 is a schematic, cross-sectional, side elevation view of an autoclave system, according to one or more examples of the present disclosure.

Referring to FIG. 2, one example of a system 100 that helps to increase the transfer of heat to the part 190, for improving cure cycle times of the part 190, is shown. The system 100 includes an autoclave 110 having an autoclave vessel 112. Accordingly, the system 100 is considered an autoclave system. The autoclave vessel 112 defines an interior cavity 150, which is configured to contain the tooling assembly 102 and the part 190 being cured. The interior cavity 150 also contains a fluid 152, which can be a gas. In certain examples, the fluid 152 is an inert gas. More specifically, according to one example, the fluid 152 is a nitrogen gas. The inert nature of the fluid 152 helps prevent unintended reactions, such as combustion events, within the autoclave vessel 112. However, in some examples, the fluid 152 is a gas other than an inert gas, such as air, which in some situations would help to retain heat in the autoclave vessel 112. The fluid 152 is initially supplied to the autoclave vessel 112 from a fluid source (not shown) and can be replenished while the part 190 is cured.

The autoclave vessel 112 is hermetically sealable such that the fluid 152 in the interior cavity 150 can be pressurized relative to an exterior 186 of the autoclave vessel 112 outside the interior cavity 150. Although not shown, the autoclave 110 additionally includes a heater that is operable to heat the fluid 152 contained within the autoclave vessel 112 to temperature at least at a cure temperature of the polymeric materials of the part 190 being formed. More specifically, the fluid 152 within the autoclave vessel 112 is heated by at least one heater to an operational temperature conducive to curing the part 190. The operational temperature of the fluid 152 is dependent on the curing temperature of the part 190. According to some examples, the operational temperature of the fluid 152 in the autoclave vessel 112 is at least 350 degrees Fahrenheit, in certain implementations, and at least 400 degrees Fahrenheit, in some implementations. In yet other implementations, the operational temperature of the fluid 152 in the autoclave vessel 112 is as low as 180 degrees and as high as at least 600 degrees Fahrenheit.

The fluid 152 can be circulated through the interior cavity 150 and around the tooling assembly 102 and the part 190 by a circulator (not shown). Circulation of the fluid 152 around the tooling assembly 102 and the part 190 helps to accelerate the transfer of heat from the fluid 152 to the tooling assembly 102 via convection by improving the efficiency of the heat transfer process.

To further aid in heating and curing the part 190, the fluid 152 within the autoclave vessel 112 is pressurized to an operational pressure P1 above atmospheric pressure P3. In some examples, the fluid 152 is pressurized to an operation pressure P1 of at least 90 pounds-per-square-inch (psi). Pressurizing the fluid 152 within the autoclave vessel 112 promotes the transfer of heat to the part 190 and improves the rate at which the part 190 cures. Additionally, pressurizing the fluid 152 in the autoclave vessel 112 helps to compress the part 190, which promotes a reduction in the voids or air pockets within the laminated features of the part 190. Pressurization of the fluid 152 can be provided by a pressurized fluid source that introduces pressurized gas into the autoclave vessel 112 prior to curing the part 190. In some examples, additional pressure is applied to the part 190 during the curing process by isolating the part 190, relative to the interior cavity 150 of the autoclave vessel 112, within a hermetically sealed container and pulling pressure from the hermetically sealed container to create vacuum conditions within the hermetically sealed container.

As mentioned previously, the autoclave 110 facilitates curing of the uncured polymer of the fiber-reinforced polymer material of the part 190 by heating the uncured polymer up to at least the curing temperature of the polymer. In the case of a thermoset polymer, heating the uncured polymer in this manner results in the hardening of the polymer by cross-linking polymer chains of the polymer. Once hardened via the curing process, the chemical transformation of the polymer is irreversible. For best results, the uncured polymer is uniformly heated to ensure the chemical composition and strength of the cured fiber-reinforced polymer material is consistent throughout the part 190.

The system 100 further includes a bladder assembly 124, which, when used in conjunction with the autoclave 110, helps facilitate faster and uniform heating of the uncured fiber-reinforced polymer material of the part 190 by utilizing the bladder 126 to distribute heat to the part 190. The bladder assembly 124 includes the bladder 126. Generally, the fluid 152 within the interior cavity 150 of the autoclave vessel 112 is circulated through the interior 127 of the bladder 126, which helps to distribute heat to less accessible surfaces, such as internal surfaces, of the part 190, which may not be heated as quickly as more accessible surfaces, such as external surfaces. Accordingly, the bladder assembly 124 is configured to help flow heated and pressurized fluid through the bladder 126 and thus to the internal surfaces of the part 190 to promote faster and more uniform heating of the part 190.

The bladder assembly 124 further includes an intake port 134, an exhaust port 138, and a pressure control device 146. The intake port 134 is fluidically coupled with the interior 127 of the bladder 126. Likewise, the exhaust port 138 is fluidically coupled with the interior 127 of the bladder 126. In some examples, the intake port 134 and the exhaust port 138 include a fluid conduit open to the interior 127 of the bladder 126. According to one example, the intake port 134 and the exhaust port 138 are open to the interior 127 of the bladder 126 by passing through a wall of the bladder 126.

The bladder assembly 124 is positioned at least partially in the interior cavity 150 of the autoclave vessel 112 when curing of the part 190 is performed. In some examples, a substantial portion or an entirety of the bladder assembly 124 is positioned in the interior cavity 150 of the autoclave vessel 112. In one example, an entirety of the bladder assembly 124, with the exception of all or a portion of the pressure control device 146, is positioned within the interior cavity 150. When positioned in the interior cavity 150 of the autoclave vessel 112, the intake port 134 is open to and thus fluidically coupled with the interior cavity 150 of the autoclave vessel 112. Accordingly, the fluid 152 in the interior cavity 150 is free or allowed to enter the interior 127 of the bladder 126 through the intake port 134. Moreover, the fluid 152, when in the interior 127 of the bladder 126, is free or allowed to exit the interior 127 of the bladder 126 through the exhaust port 138.

The pressure control device 146 is fluidically coupled with the exhaust port 138. Moreover, the pressure control device 146 is configured to control or limit a pressure drop across the interior 127 of the bladder 126. The pressure drop induces a portion of the fluid 152 in the interior cavity 150 to flow, as indicated by arrows 154, into the interior 127 of the bladder 126 through the intake port 134, flow through the interior 127 of the bladder 126, and flow out of the interior 127 of the bladder 126. Accordingly, the pressure control device 146 can be considered and defined as a flow control device that is configured to control or regulate the flow of the fluid 152 through the interior 127 of the bladder 126 and from the interior 127 to the exterior 186. Because the fluid 152 is heated, heat from the fluid 152, as it flows through the interior 127 of the bladder 126 is more readily transferred to the bladder 126 via conduction and convection than if the fluid 152 in the interior 127 was stagnant or non-flowing. As previously described, heat from the bladder 126 is transferred to the part 190 for curing the part 190. Therefore, flowing the fluid 152 through the bladder 126, via the pressure drop, promotes improved heat transfer from the bladder 126 to the part 190, and thus lower lagging temperature gradients in the part 190 and improved cure cycle times and results.

The bladder 126 includes a first end portion 140 and a second end portion 142. The first end portion 140 and the second end portion 142 define opposite ends of the interior 127, including the hollow interior channel 128, of the bladder 126. In some examples, the bladder 126, including the hollow interior channel 128, extends lengthwise from the first end portion 140 to the second end portion 142. The intake port 134 passes through a wall of the bladder 126 at the first end portion 140. Accordingly, the bladder 126 includes an intake opening or aperture at the first end portion 140 that at least partially defines the intake port 134.

To facilitate a seal at the first end portion 140, about the intake opening in the wall of the bladder 126, the bladder assembly 124 further includes an intake plug 132. The intake plug 132 is fixed to the first end portion 140 of the bladder 126. Moreover, the intake plug 132 includes an intake conduit, fluidically open to the interior cavity 150 of the autoclave vessel 112 and to the intake opening in the wall of the bladder 126 that at least partially defines the intake port 134. In other words, in some examples, the intake port 134 passes through and is defined by the intake opening in the wall of the bladder 126 and the intake conduit formed in the intake plug 132. The intake plug 132 includes one or more fittings configured to fixedly attach to the first end portion 140 of the bladder 126. Accordingly, the intake plug 132 has a one-piece monolithic and seamless construction in some examples and a multi-piece construction in other examples. Moreover, the intake plug 132 can be permanently fixedly attached to the bladder 126 or be configured to selectively releasably attach to the bladder 126.

Figure 3:
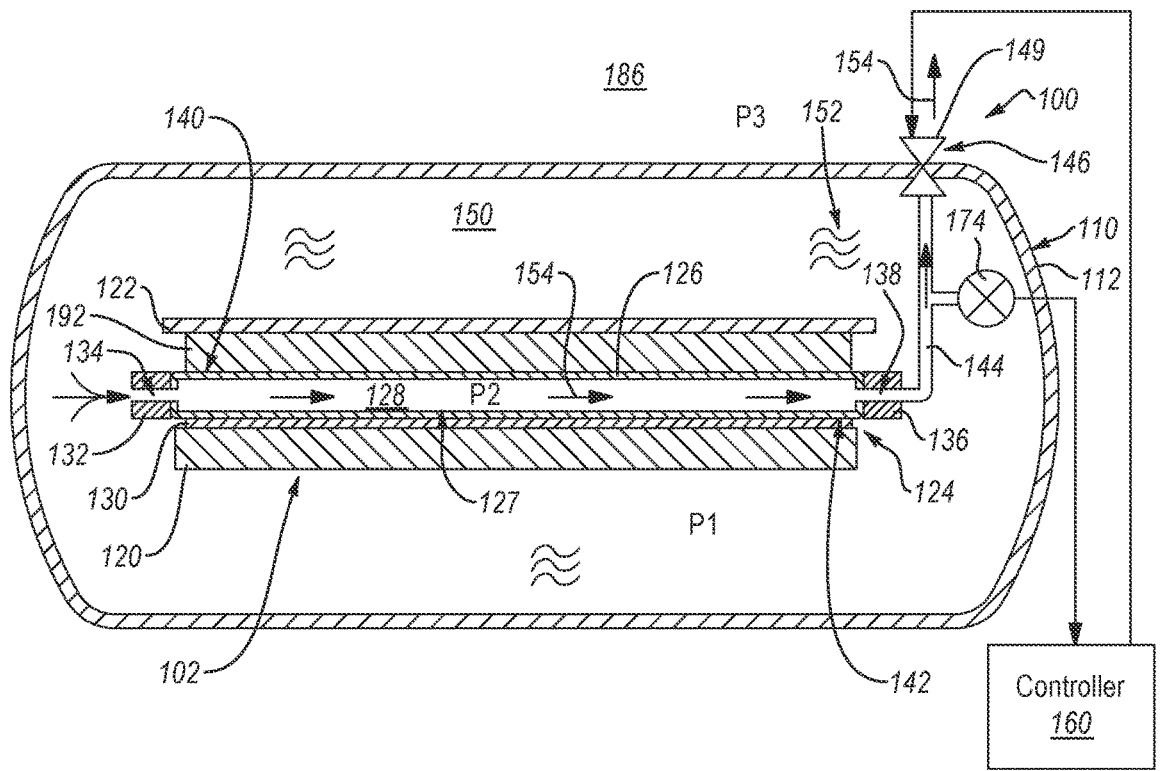
FIG. 3 is a schematic, cross-sectional, side elevation view of an autoclave system, according to one or more examples of the present disclosure.

According to some examples, such as shown in FIGS. 2 and 3, the bladder assembly 124 also includes an exhaust plug 136 that is fixed to the second end portion 142 of the bladder 126. In such examples, the exhaust port 138 passes through a wall of the bladder 126 at the second end portion 142. Accordingly, in the examples shown in FIGS. 2 and 3, the bladder 126 includes an exhaust opening or aperture at the second end portion 142 that at least partially defines the exhaust port 138. The exhaust plug 136 includes an exhaust conduit, fluidically open to the exhaust opening in the wall of the bladder 126, that at least partially defines the exhaust port 138, and to the pressure control device 146. Accordingly, the exhaust conduit in the exhaust plug 136 is not open to the interior cavity 150 of the autoclave vessel 112, but instead opens to the pressure control device 146. In the illustrated examples of FIGS. 2 and 3, the exhaust port 138 passes through and is defined by the exhaust opening in the wall of the bladder 126 and the exhaust conduit formed in the exhaust plug 136. The exhaust plug 136 includes one or more fittings configured to fixedly attach to the second end portion 142 of the bladder 126. Accordingly, the exhaust plug 136 has a one-piece monolithic and seamless construction in some examples and a multi-piece construction in other examples. Moreover, the exhaust plug 136 can be permanently fixedly attached to the bladder 126 or be configured to selectively releasably attach to the bladder 126.

Referring to FIGS. 2 and 3, in some examples, the bladder assembly 124 includes an exhaust tube 144 that fluidically couples the exhaust port 138 to the pressure control device 146. Moreover, the pressure control device 146 is fluidically open, whether directly or indirectly, to an exterior 186 outside the interior cavity 150 of the autoclave vessel 112. Accordingly, the fluid 152 exiting the interior 127 of the bladder 126 through the exhaust port 138 is expelled into the exterior 186 (e.g., atmosphere), as indicated by a directional arrow 154, via the exhaust tube 144 and the pressure control device 146. In certain examples, the pressure control device 146 is located within the interior cavity 150 of the autoclave vessel 112 and is open to the exterior 186 via an extension tube (not shown) coupled to the wall of the autoclave vessel 112. According to other examples, as shown, the pressure control device 146 is coupled to the wall of the autoclave vessel 112. In yet alternative examples, the pressure control device 146 is located in the exterior 186 outside the interior cavity 150 and the exhaust tube 144 passes through the wall of the autoclave vessel 112.

The pressure control device 146, being open to the exterior 186 at the atmospheric pressure P3 and in fluidic communication with the fluid 152 at the operational pressure P1, via the bladder 126, is configured to control the flow of fluid 152 from the interior cavity 150 and the bladder 126 in a manner that results in a drop of the pressure P2 of the fluid 152 in the bladder 126 to below the operation pressure P1 and above the atmospheric pressure P3. The drop in pressure from P1 to P2 and from P2 to P3 facilitates the flow of the fluid 152 through the interior 127 of the bladder 126. Because the bladder 126 is flexible and hollow, to prevent the collapse of the bladder 126 on itself but to ensure sufficient flow of the fluid 152 through the interior 127, the pressure control device 146 limits the pressure drop from P1 to P2 (i.e., the pressure drop across the interior 127 of the bladder 126) to greater than zero, but less than or equal to a pressure-drop percentage threshold. In one example, the pressure-drop percentage threshold is 5%. According to other examples, the pressure-drop percentage threshold is between 2% and 4%.

In some examples, as shown in FIG. 2, the pressure control device 146 is a passive device configured to passively control the pressure drop across the interior 127 of the bladder 126. For example, the pressure control device 146 can be a passive pressure control device 147, such as a passive flow control valve or orifice. The passive flow control valve enables a constant flow rate through the valve independently of pressure changes at the inlet of the valve. The orifice, which can be a fixed-diameter orifice, provides a constant pressure drop across the orifice. Accordingly, the passive pressure control device 147 can be designed to provide a fixed pressure drop across the interior 127 of the bladder 126.

According to other examples, as shown in FIG. 3, the pressure control device 146 is an active device configured to actively control the pressure drop across the interior 127 of the bladder 126. For example, the pressure control device 146 can be an active pressure control device 149, such as a controllable or adjustable valve or orifice. The active pressure control device 149 enables a variable or adjustable flow rate through the device in response to pressure changes at the inlet of the device. Accordingly, the active pressure control device 149 can be controlled to provide a changing pressure drop or a fixed pressure drop across the interior 127 of the bladder 126.

Referring to FIG. 3, in some examples, the bladder assembly 124 additionally includes a pressure sensor 174 that is fluidically coupled with the exhaust port 138 between the exhaust port 138 and the pressure control device 146. The pressure sensor 174 is configured to sense or detect the pressure P2 of the fluid 152 exiting the exhaust port 138 before the fluid 152 passes through the pressure control device 146. In such examples, active control of the pressure drop using the active pressure control device 149 can be dependent on (e.g., actuatable in response to) feedback from the pressure sensor 174.

The system 100 further includes a controller 160 in certain examples. The controller 160 is operably coupled with the pressure sensor 174 and the active pressure control device 149. The controller 160 is configured to receive feedback from the pressure sensor 174, such as in the form of electronic signals (e.g., pressure readings) indicative of the pressure P2 of the fluid 152 sensed by the pressure sensor 174, and command or control actuation of the active pressure control device 149 to adjust the flow rate through the device in response to the feedback from the pressure sensor 174. More specifically, in some implementations, the controller 160 compares the pressure readings from the pressure sensor 174 to a predetermined pressure-drop range and controls the active pressure control device 149 to achieve a pressure drop from the pressure P1 to the pressure P2 that falls within the predetermined pressure-drop range. The comparison performed by the controller 160 includes receiving data regarding the operational pressure P1 within the interior cavity 150 of the autoclave vessel 112 and determining a difference between the operational pressure P1 and the pressure P2 (as sensed by the pressure sensor 174), which is equal to the actual pressure drop across the interior 127 of the bladder 126. The data regarding the operational pressure P1 can be obtained from a pressure sensor in pressure sensing communication with the interior cavity 150. The controller 160 commands the active pressure control device 149 to make flow throughput adjustments to ensure the difference between the operational pressure P1 and the pressure P2 stays within the predetermined pressure-drop range. In some examples, the controller 160 further utilizes the atmospheric pressure P3 to determine the degree of throughput adjustments necessary to achieve a desired pressure drop across the interior 127 of the bladder 126.

In the examples shown in FIGS. 2 and 3, the fluid 152 flows through the hollow interior channel 128 of the interior 127 of the bladder 126 from the first end portion 140 to the second end portion 142. Accordingly, the bladder assembly 124 includes both the intake plug 132 at the first end portion 140 and an exhaust plug 136 at the second end portion 142. However, in other examples, such as shown in FIGS. 4, 5, 9, and 10, the bladder assembly 124 does not include the exhaust plug 136 and the fluid 152 flows through the interior 127 of the bladder 126 in a first direction from the first end portion 140 to the second end portion 142 and is then redirected to flow in a second direction, opposite the first direction, from the second end portion 142 to the first end portion 140. Moreover, in the examples shown in FIGS. 4, 5, 9, and 10, the exhaust port 138 passes through an exhaust conduit formed in the intake plug 132. Accordingly, the intake plug 132 includes both an intake conduit, which forms a portion of the intake port 134, and a fluidically separate exhaust conduit, which forms a portion of the exhaust port 138. The second end portion 142 of the bladder 126 is closed.

The bladder assembly 124 of FIGS. 4, 5, 9, and 10, having one plug (i.e., the intake plug 132) simplifies the construction of the bladder assembly 124. Moreover, because securing fittings or connections, such as the intake plug 132, to the bladder 126 can be difficult in certain situations, reducing the number of fittings in the bladder assembly 124 can be advantageous. Additionally, a bladder assembly 124 with only one plug on one end portion of the bladder 126 makes removal of the bladder 126 from the part 190 following curing easier than a bladder assembly 124 with two plugs on corresponding opposite end portions of the bladder 126.

Figure 4:
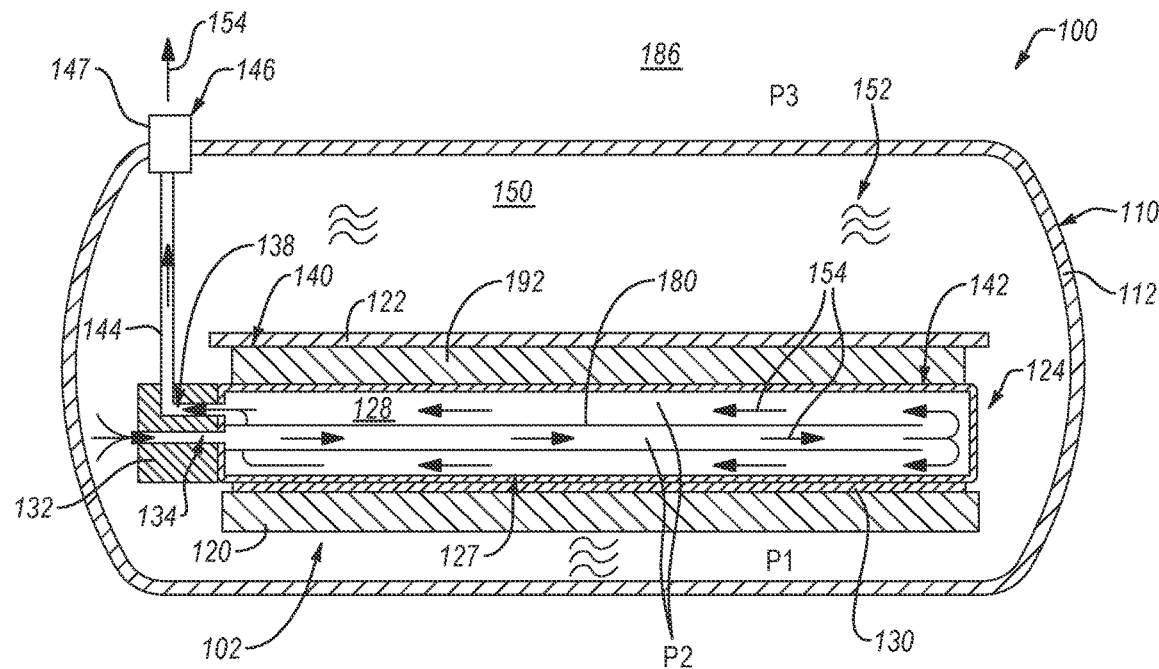
FIG. 4 is a schematic, cross-sectional, side elevation view of an autoclave system, according to one or more examples of the present disclosure.
Figure 5:
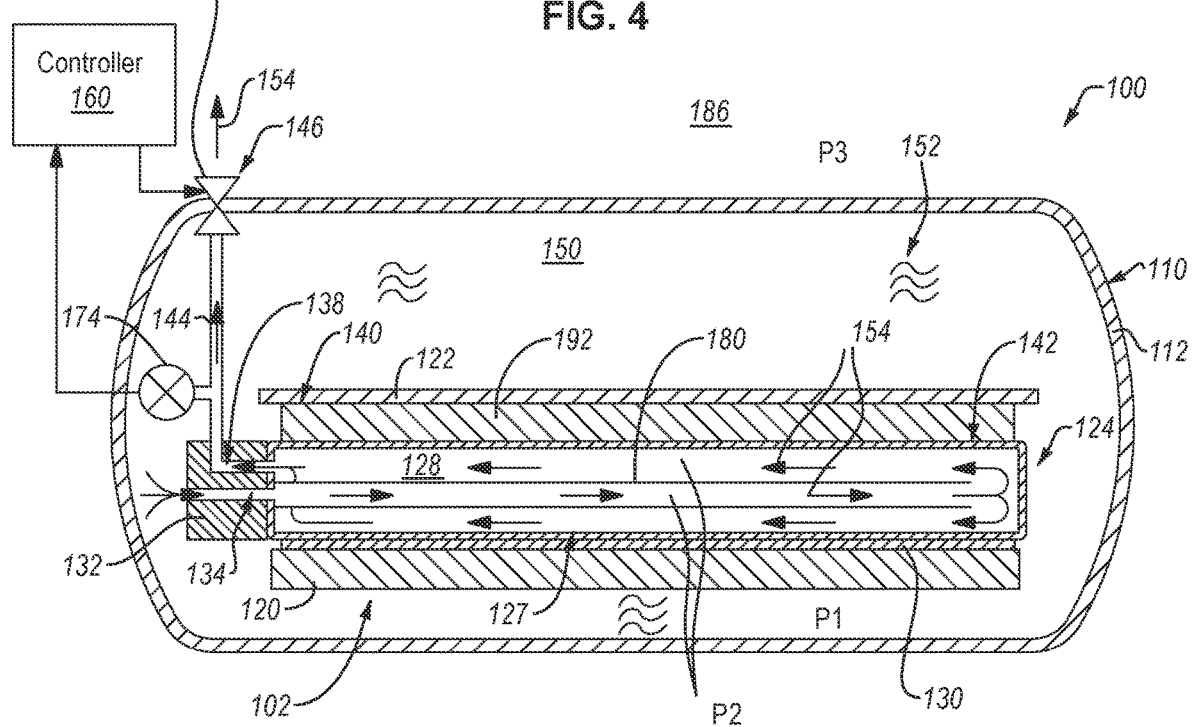
FIG. 5 is a schematic, cross-sectional, side elevation view of an autoclave system, according to one or more examples of the present disclosure.

Referring to FIGS. 4 and 5, within certain examples, the bladder assembly 124 further includes a tube 180 that facilitates the dual directionality of the flow of the fluid 152. The tube 180 is hollow and passes through the hollow interior channel 128 from the first end portion 140 of the bladder 126 toward the second end portion 142 of the bladder 126. The tube 180 is fluidically coupled with the intake port 134 at the first end portion 140 of the bladder 126. Additionally, the tube 180 terminates before a closed end of the second end portion 142 of the bladder 126. Therefore, the tube 180 is open to the hollow interior channel 128 proximate the second end portion 142 of the bladder 126. The tube 180 has a cross-sectional area smaller than the cross-sectional area of the hollow interior channel 128. In some examples, the tube 180 passes through a central portion of (e.g., is concentric with) the hollow interior channel 128. Accordingly, in these examples, the hollow interior channel 128 circumscribes (e.g., circumferentially surrounds) the tube 180.

In operation, the pressure drop across the interior 127 of the bladder 126 between the intake port 134 and the exhaust port 138 induces flow of the fluid 152 from the interior cavity 150 of the autoclave vessel 112 into the intake port 134. From the intake port 134, the fluid 152 flows through the tube 180 away from the first end portion 140 of the bladder 126 toward the second end portion 142 of the bladder 126. The fluid 152 then exits the tube 180 into the hollow interior channel 128 proximate the second end portion 142 and, due to the closed end of the bladder 126 at the second end portion 142, reverses direction back toward the first end portion 140 through the hollow interior channel 128 on the outside of the tube 180. When back at the first end portion 140, the fluid 152 exits the hollow interior channel 128 through the exhaust port 138 and ultimately exits the autoclave vessel 112. As the fluid 152 flows from the second end portion 142 toward the first end portion 140, heat from the fluid 152 is transferred to the bladder 126, which is subsequently transferred to the part 190 for curing the part 190. The control of the pressure drop across the interior 127 of the bladder 126 and the flow of the fluid 152 through the interior 127 of the bladder 126 can be performed passively, as shown in FIG. 4, or actively, as shown in FIG. 5. As shown, the features for passively and actively controlling the pressure drop and flow of the fluid 152 can be similar to or the same as those shown in and described in associated with FIGS. 2 and 3, respectively.

Figure 13A:
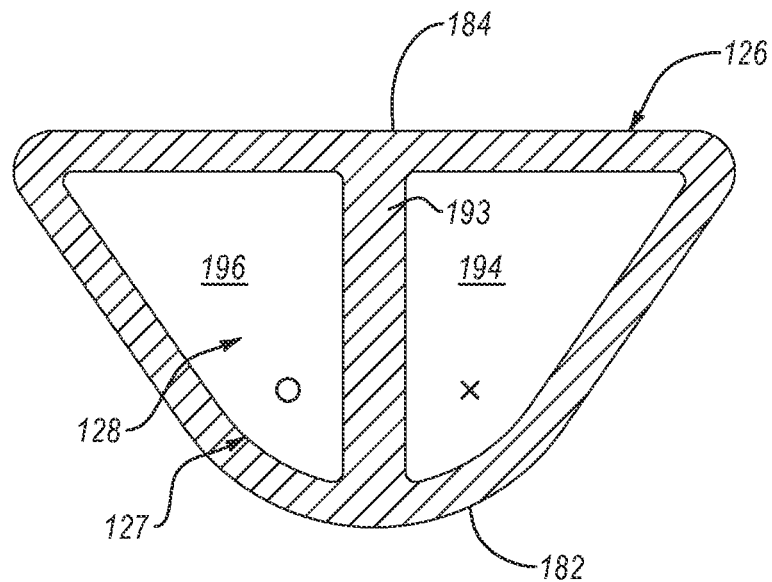
FIG. 13A is a schematic, cross-sectional, front elevation view of a bladder, taken along a line similar to the line 8-8 of FIGS. 6 and 7, according to one or more examples of the present disclosure.
Figure 13B:
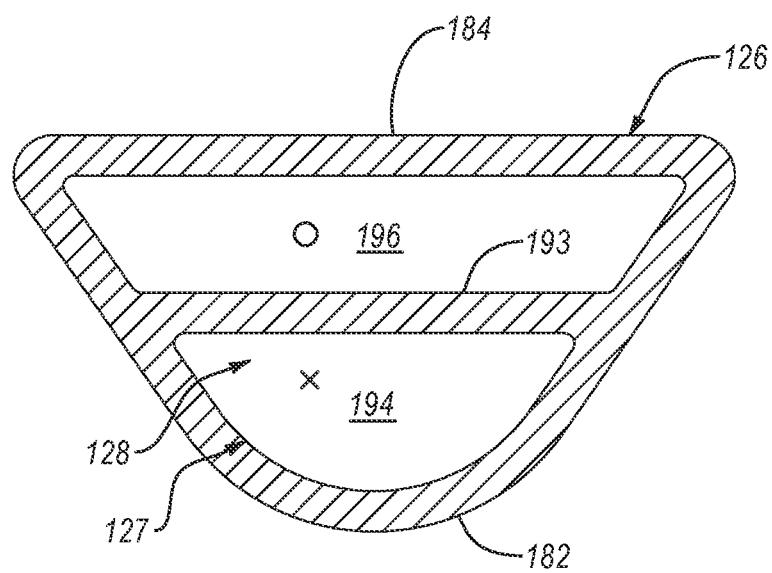
FIG. 13B is a schematic, cross-sectional, front elevation view of a bladder, taken along a line similar to the line 8-8 of FIGS. 6 and 7, according to one or more examples of the present disclosure.

As shown in FIGS. 13A and 13B, instead of the tube 180, in some examples, to facilitate dual directionality of the flow of the fluid 152 and a single plug, the bladder 126 includes one or more interior walls that divides the hollow interior channel 128 into multiple separate sub-channels. For example, the bladder 126 of FIGS. 13A and 13B includes an interior wall 193 that divides the hollow interior channel 128 into an outflow sub-channel 194 and an inflow sub-channel 196. The outflow sub-channel 194 is fluidically coupled with the intake port 134 and the inflow sub-channel 196 is fluidically coupled with the exhaust port 138. Accordingly, the fluid 152 flows away from the intake port 134, into the page in FIGS. 13A and 13B (as indicated by an 'X'), and the fluid 152 flows back, in an opposite direction, toward the exhaust port 138, out of the page in FIGS. 13A and 13B (as indicated by an dot). Although not shown, the interior wall 193 terminates before a closed end of the bladder 126 and the closed end of the bladder 126 redirects the flow of the fluid 152 from the outflow sub-channel 194 to the inflow sub-channel 196. In one example, as shown in FIG. 13A, the interior wall 193 is a vertical interior wall and the outflow sub-channel 194 and the inflow sub-channel 196 are on opposite sides of the bladder 126. In contrast, in another example, as shown in FIG. 13B, the interior wall 193 is a horizontal interior wall and the outflow sub-channel 194 and the inflow sub-channel 196 are on bottom and top portions of the bladder 126, respectively. Although a single interior wall and two sub-channels are shown, in other examples, multiple interior walls can be employed to create more than two sub-channels.

Figure 6:
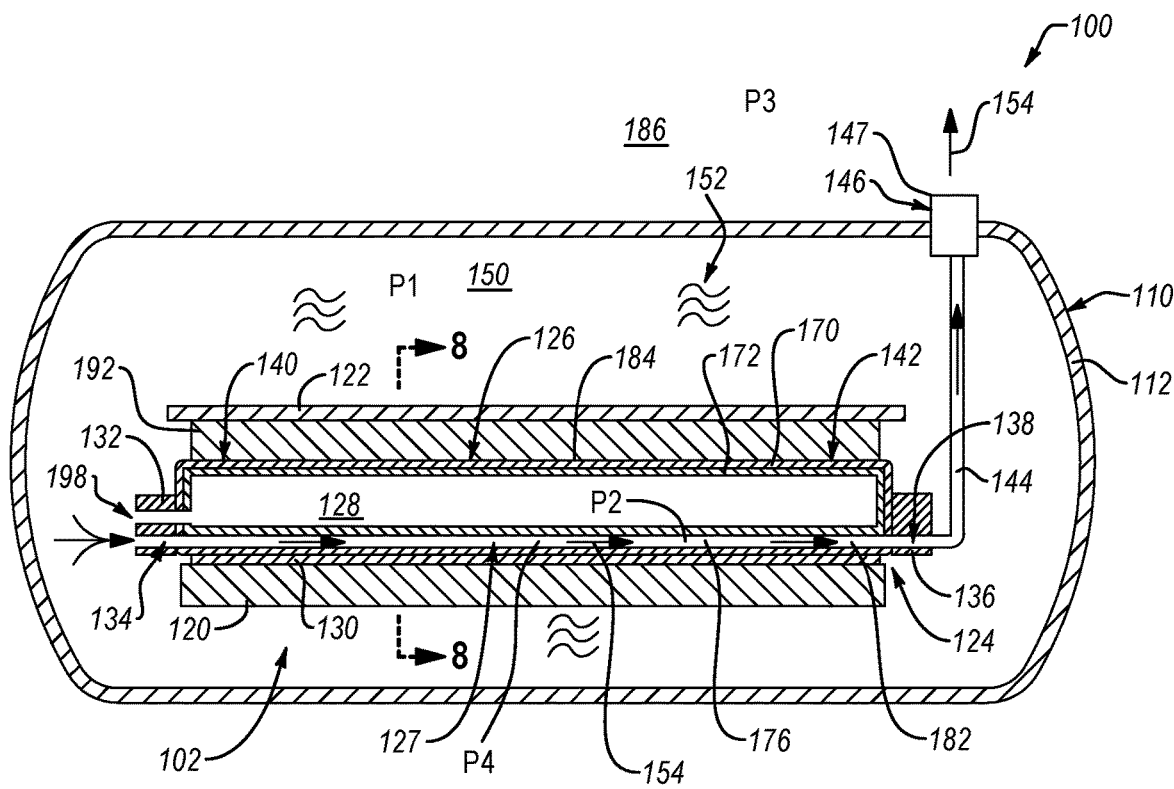
FIG. 6 is a schematic, cross-sectional, side elevation view of an autoclave system, according to one or more examples of the present disclosure.
Figure 7:
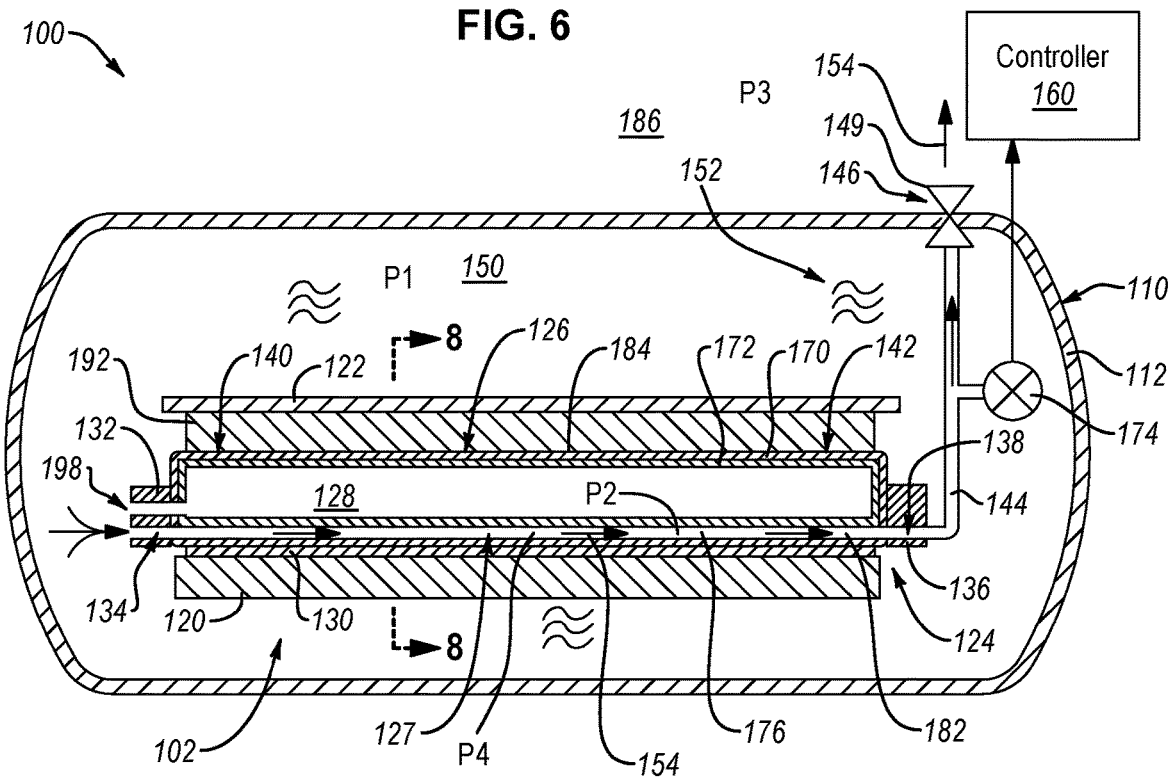
FIG. 7 is a schematic, cross-sectional, side elevation view of an autoclave system, according to one or more examples of the present disclosure.
Figure 8:
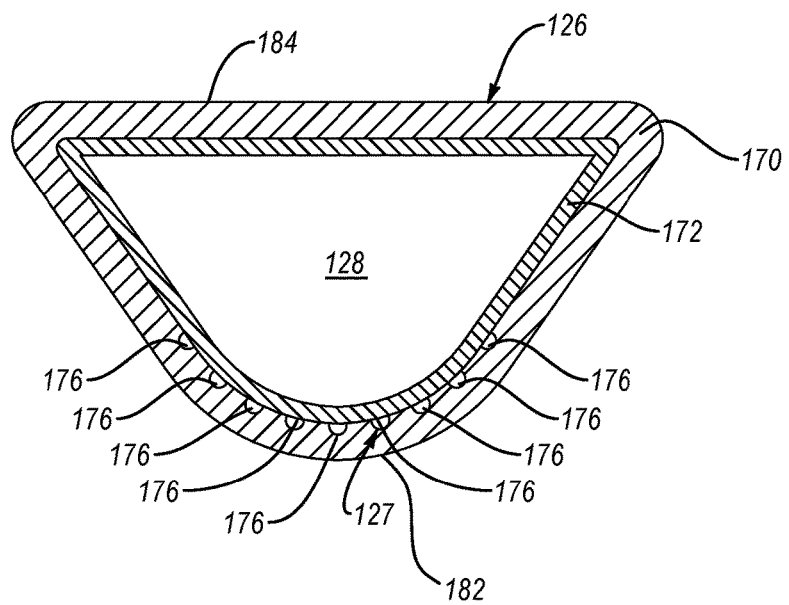
FIG. 8 is a schematic, cross-sectional, front elevation view of a bladder, taken along the line 8-8 of FIGS. 6 and 7.

Referring now to FIGS. 6-8, according to some examples, the bladder 126 includes multiple layers that form the wall of the bladder 126. For example, as shown in FIG. 8, the bladder 126 includes an outer layer 170 and an inner layer 172. The outer layer 170 defines an exterior surface of the bladder 126 and the inner layer 172 defines an interior surface of the bladder 126. Additionally, the inner layer 172 defines the hollow interior channel 128 of the interior 127 of the bladder 126. The outer layer 170 and the inner layer 172 are made from the same material in certain examples. Alternatively, in other examples, the outer layer 170 and the inner layer 172 are made from different materials. The outer layer 170 and the inner layer 172 are separately formed and coupled together (e.g., bonded, adhered, fastened, etc.) to form the bladder 126. Although two layers are shown, the bladder 126 can include more than two layers in some examples.

The bladder 126 of FIGS. 6-8 includes at least one fluid flow conduit 176 interposed between the outer layer 170 and the inner layer 172. The fluid flow conduit 176 may be defined between a groove formed in the outer layer 170 and the opposing surface of the inner layer 172 (as shown), a groove formed in the inner layer 172 and the opposing surface of the outer layer 170, or grooves formed in both the inner layer 172 and the outer layer 170. Additionally, the fluid flow conduit 176 can be located at any of various locations within the bladder 126, such as a bottom portion 182 of the bladder 126 (as shown), a top portion 184 of the bladder 126, or one of two side portions of the bladder 126. Generally, the fluid flow conduit 176 is located at a location of the bladder 126 corresponding with locations on the part 190 that can benefit from the additional heat flowing through the bladder 126. The fluid flow conduit 176 forms part of the interior 127 of the bladder 126. Accordingly, as used herein, the interior 127 of the bladder 126 can include the hollow interior channel 128 and a separate one or more fluid flow conduits 176.

In this illustrated example, the fluid flow conduit 176 extends from the first end portion 140 of the bladder 126 to the second end portion 142 of the bladder 126. At the first end portion 140, the fluid flow conduit 176 is fluidically coupled with the intake port 134, which is partially formed through the intake plug 132 fixed to the first end portion 140, and at the second end portion 142, the fluid flow conduit 176 is fluidically coupled with the exhaust port 138, which is partially formed through the exhaust plug 136 fixed to the second end portion 142. At least one of the intake plug 132 or the exhaust plug 136 includes a vent 198 that passes through the corresponding one or both of the intake plug 132 and the exhaust plug 136 and passes through the wall of the bladder 126. The vent 198 enables the hollow interior channel 128 to be pressurized to the operational pressure P1 of the fluid 152 in the interior cavity 150.

In operation, the pressure drop across the interior 127 of the bladder 126 between the intake port 134 and the exhaust port 138 induces flow of the fluid 152 from the interior cavity 150 of the autoclave vessel 112 into the intake port 134. From the intake port 134, the fluid 152 flows through the fluid flow conduit 176 away from the first end portion 140 of the bladder 126 toward the second end portion 142 of the bladder 126. The fluid 152 then exits the fluid flow conduit 176 into the exhaust port 138 and ultimately exits the autoclave vessel 112. As the fluid 152 flows from the first end portion 140 toward the second end portion 142, heat from the fluid 152 is transferred to the bladder 126, which is subsequently transferred to the part 190 for curing the part 190. The control of the pressure drop across the interior 127 of the bladder 126 (which in this example is a pressure drop across the fluid flow conduit 176), and the flow of the fluid 152 through the interior 127 of the bladder 126 can be performed passively, as shown in FIG. 6, or actively, as shown in FIG. 7. As shown, the features for passively and actively controlling the pressure drop and flow of the fluid 152 can be similar to or the same as those shown in and described in associated with FIGS. 2 and 3, respectively.

To promote distribution of heat from the bladder 126 to the part 190, in some examples, the fluid flow conduit 176 can be larger than as shown. Alternatively, to promote distribution of heat from the bladder 126 to the part 190, in some examples, as shown, the bladder 126 includes a plurality of fluid flow conduits 176 between the outer layer 170 and the inner layer 172 and fluidically coupled with the intake port 134 and the exhaust port 138. Although the plurality of fluid flow conduits 176 are shown to be concentrated on the bottom portion 182 of the bladder 126, in other examples, the fluid flow conduits 176 can be concentrated on additional or alternative portions of the bladder 126 (e.g., to transfer heat to targeted portions of the part 190) or the fluid flow conduits 176 can be evenly distributed around the bladder 126 (e.g., to promote an even distribution of heat to the part 190).

Figure 9:
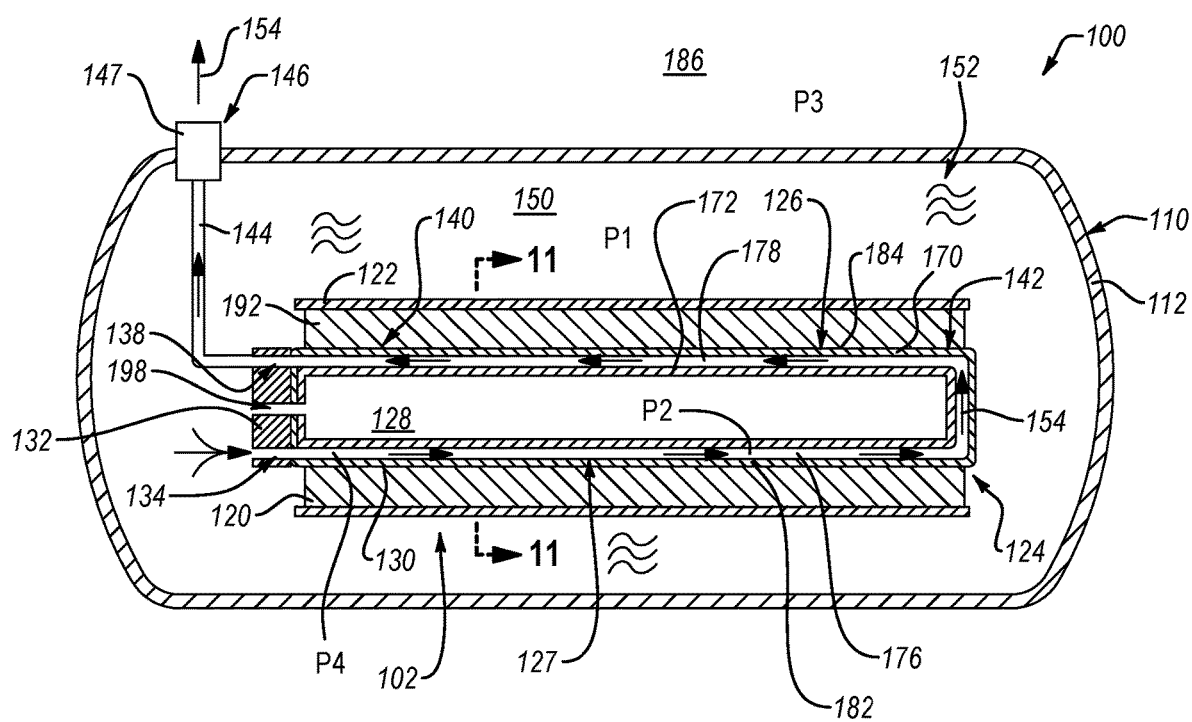
FIG. 9 is a schematic, cross-sectional, side elevation view of an autoclave system, according to one or more examples of the present disclosure.
Figure 10:
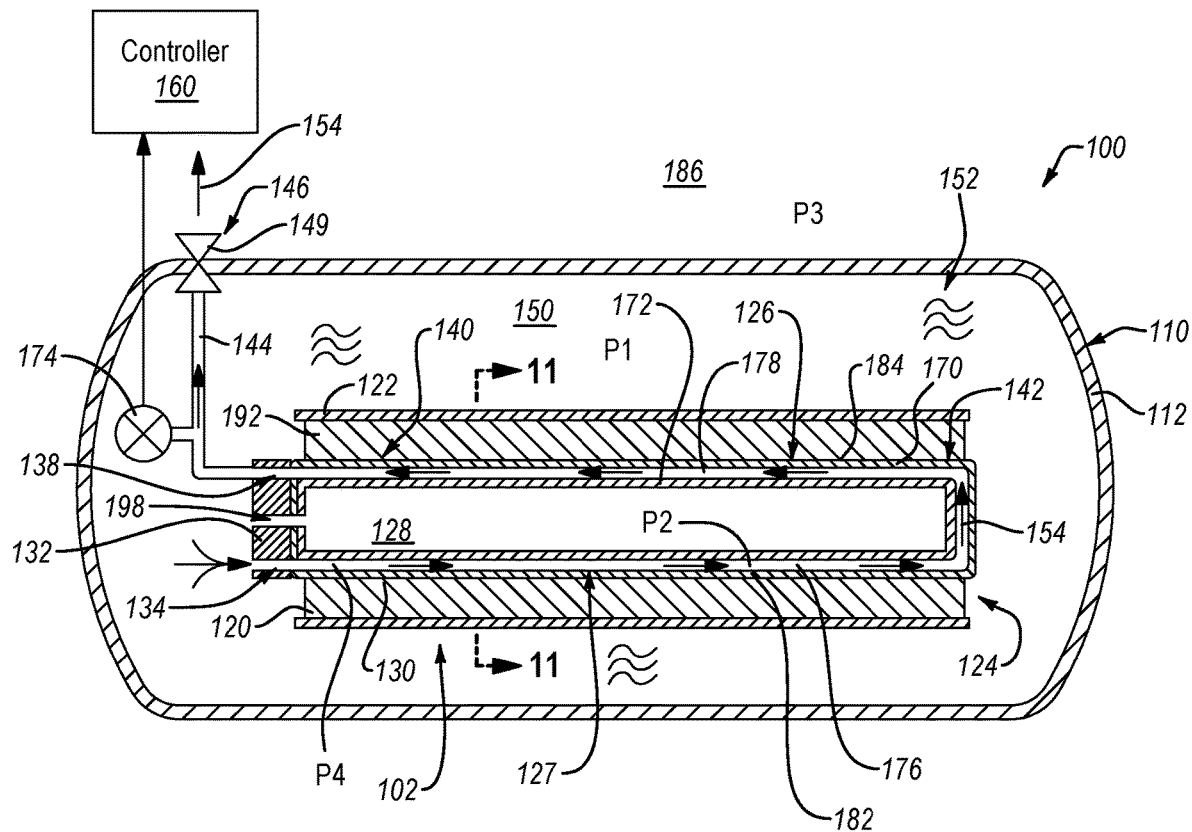
FIG. 10 is a schematic, cross-sectional, side elevation view of an autoclave system, according to one or more examples of the present disclosure.
Figure 11:
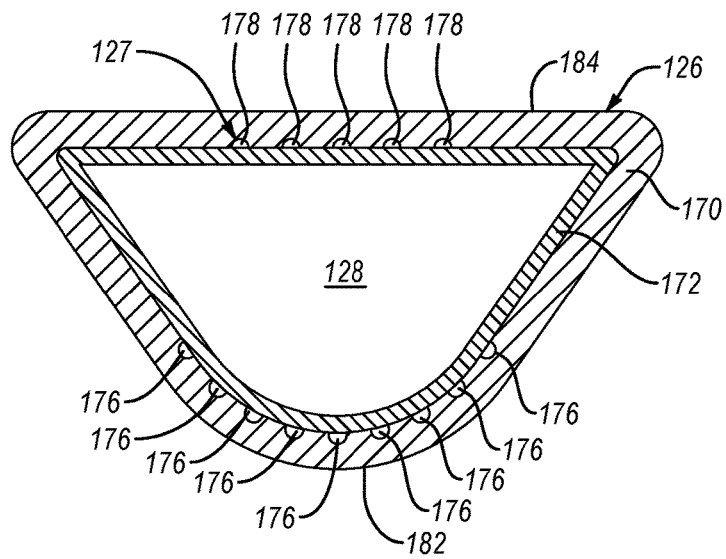
FIG. 11 is a schematic, cross-sectional, front elevation view of a bladder, taken along the line 11-11 of FIGS. 9 and 10, according to one or more examples of the present disclosure.

Like the bladder 126 of FIGS. 6-8, the bladder 126 of FIGS. 9-11 includes at least one fluid flow conduit 176 interposed between the outer layer 170 and the inner layer 172. However, unlike the fluid flow conduit 176 of FIGS. 6-8, the fluid flow conduit 176 of FIGS. 9-11 is not fluidically coupled with an exhaust port 138 in an exhaust plug 136, but rather is fluidically coupled with a second fluid flow conduit 178 that is fluidically coupled with an exhaust port 138 in the intake plug 132. The fluid flow conduit 176 is considered an inflow conduit and the second fluid flow conduit 178 is considered an outflow conduit. The fluid flow conduit 176 and the second fluid flow conduit 178 together form a continuous fluid flow conduit that extends from the first end portion 140 of the bladder 126 to the second end portion 142 of the bladder 126, wraps around the closed end of the bladder 126 at the second end portion 142, and extends from the second end portion 142 back to the first end portion 140.

The fluid flow conduit 176 and the second fluid flow conduit 178 can be located at any of various opposing locations within the bladder 126. In an example, the fluid flow conduit 176 extends along a first side of the bladder 126, and the second fluid flow conduit 178 extends along a second side 184 of the bladder 126. In an example, the first side of the bladder is the bottom portion 182 and the second side of the bladder is top portion 184. For instance, the fluid flow conduit 176 can be located in the bottom portion 182 of the bladder 126 and the second fluid flow conduit 178 can be located in the top portion 184 of the bladder 126 (as shown). However, these locations can be reversed or the locations can be different, such as opposing side portions. Generally, the fluid flow conduit 176 and the second fluid flow conduit 178 are located at locations of the bladder 126 corresponding with locations on the part 190 that can benefit from the additional heat flowing through the bladder 126. The fluid flow conduit 176 and the second fluid flow conduit 178 form part of the interior 127 of the bladder 126. Accordingly, as used herein, the interior 127 of the bladder 126 can include the hollow interior channel 128 and a separate one or more fluid flow conduits 176 and second fluid flow conduits 178.

In operation, the pressure drop across the interior 127 of the bladder 126 between the intake port 134 and the exhaust port 138 induces flow of the fluid 152 from the interior cavity 150 of the autoclave vessel 112 into the intake port 134. From the intake port 134, the fluid 152 flows through the fluid flow conduit 176 away from the first end portion 140 of the bladder 126 toward the second end portion 142 of the bladder 126. The fluid 152 then changes direction and enters the second fluid flow conduit 178. The fluid 152 flows along the second fluid flow conduit 178 away from the second end portion 142 of the bladder 126 toward the first end portion 140. From the second end portion 142, the fluid 152 flows into the exhaust port 138 and then ultimately exits the autoclave vessel 112. As the fluid 152 flows from the first end portion 140 toward the second end portion 142 and back toward the first end portion 140, heat from the fluid 152 is transferred to the bladder 126, which is subsequently transferred to the part 190 for curing the part 190. The control of the pressure drop across the interior 127 of the bladder 126 (which in this example is a pressure drop across the fluid flow conduit 176 and the second fluid flow conduit 178), and the flow of the fluid 152 through the interior 127 of the bladder 126 can be performed passively, as shown in FIG. 9, or actively, as shown in FIG. 10. As shown, the features for passively and actively controlling the pressure drop and flow of the fluid 152 can be similar to or the same as those shown in and described in associated with FIGS. 2 and 3, respectively.

To promote distribution of heat from the bladder 126 to the part 190, in some examples, the fluid flow conduit 176 and the second fluid flow conduit 178 can be larger than as shown. Alternatively, to promote distribution of heat from the bladder 126 to the part 190, in some examples, as shown, the bladder 126 includes a plurality of fluid flow conduits 176, spaced apart from each other, and second fluid flow conduits 178, spaced apart from each other, between the outer layer 170 and the inner layer 172 and fluidically coupled with the intake port 134 and the exhaust port 138. Although the plurality of fluid flow conduits 176 and the second fluid flow conduits 178 are shown to be concentrated on the bottom portion 182 and the top portion 184 of the bladder 126, respectively, in other examples, the fluid flow conduits 176 and the second fluid flow conduits 178 can be concentrated on additional or alternative portions of the bladder 126 (e.g., to transfer heat to targeted portions of the part 190) or the fluid flow conduits 176 and the second fluid flow conduits 178 can be evenly distributed around the bladder 126 (e.g., to promote an even distribution of heat to the part 190).

Figure 12:
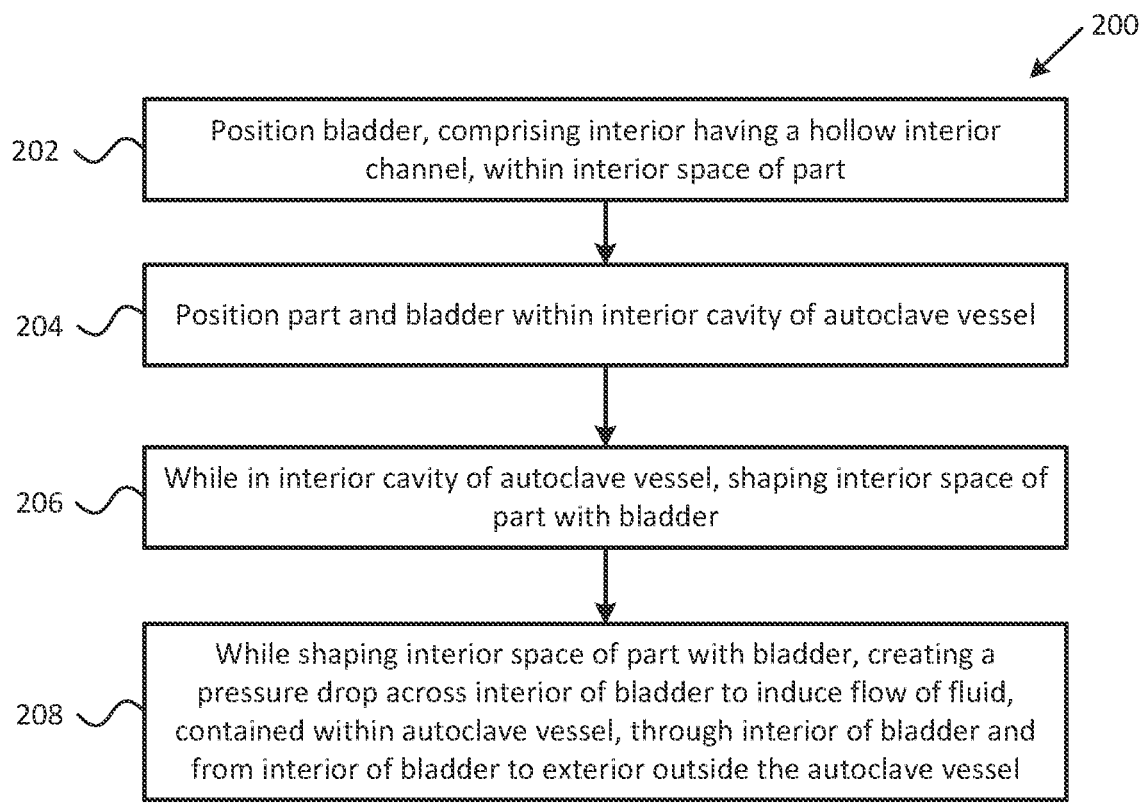
FIG. 12 is a schematic flow diagram of a method of forming a part made of fiber-reinforced polymeric material, according to one or more examples of the present disclosure.

Referring to FIG. 12, one example of a method 200, which summarizes the method of forming the part 190 using the bladder assembly 124 and autoclave 110 of the system 100 as described throughout the above disclosure, is shown. The method 200 includes (block 202) positioning the bladder 126 within the interior space 129 of the part 190 and (block 204) positioning the part 190 and the bladder 126 within the interior cavity 150 of the autoclave vessel 112. The method 200 also includes (block 206), while in the interior cavity 150 of the autoclave vessel 112, shaping the interior space 129 of the part 190 with the bladder 126. The method further includes (block 208), while shaping the interior space 129 of the part 190 with the bladder 126, creating a pressure drop across the interior 127 of the bladder 126, with the pressure control device 146 fluidically coupled with the interior 127 of the bladder 126 and the exterior 186 outside the autoclave vessel 112, to induce flow of the fluid 152, contained within the autoclave vessel 112, through the interior 127 of the bladder 126 and from the interior 127 of the bladder 126 to the exterior 186 outside the autoclave vessel 112.

In some examples of the method 200, the fluid 152 flows into the interior 127 of the bladder 126 from the first end portion 140 of the bladder 126 and flows out of the interior 127 of the bladder 126 to the exterior 186 outside the autoclave vessel 112 from the second end portion 142 of the bladder 126.

In yet other examples of the method 200, the fluid 152 flows into the interior 127 of the bladder 126 from the first end portion 140 of the bladder 126 and flows out of the interior 127 of the bladder 126 to the exterior 186 outside the autoclave vessel 112 from the first end portion 140 of the bladder 126. The fluid 152 can flow through the interior 127 of the bladder 126 in a first direction from the first end portion 140 of the bladder 126 to the second end portion 142 of the bladder 126 and in a second direction, opposite the first direction, from the second end portion 142 of the bladder 126 to the first end portion 140 of the bladder 126.

According to some examples of the method 200, the fluid 152 flows through the interior 127 of the bladder 126 between an inner layer 172 of the bladder 126 and an outer layer of the bladder 170.

In certain examples, the method 200 further includes comparing the first pressure P1 of the fluid 152 within the autoclave vessel 112 to the second pressure P2 of the fluid 152 within the interior 127 of the bladder 126 to provide a comparison between the first pressure P1 and the second pressure P2. The method 200 can also include controlling actuation of the pressure control device 146, to control the pressure drop across the interior 127 of the bladder 126, in response to the comparison between the first pressure P1 and the second pressure P2.

Within examples, the method 200 can involve using the disclosed bladder assembly 124 to create the pressure drop across the interior 127 of the bladder 126 to induce flow of the fluid 152, contained within the autoclave vessel 112, through the interior 127 of the bladder 126 and from the interior 127 of the bladder 126 to the exterior 186 outside the autoclave vessel 112. For instance, the method 200 can involve using the bladder assembly 124 illustrated in any of FIG. 2, 3, 4, 5, 6, 7, 9, or 10 to create the pressure drop to induce the flow of fluid 152. Further, within examples, the bladder 126 of method 200 can be the bladder 126 illustrated in any of FIGS. 1A-11, 13A, and 13B.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two."

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one example of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described examples are to be considered in all respects only as illustrative and not restrictive. All changes which come within the meaning and range of equivalency of the claims are to be embraced within their scope.

What is claimed is:

1. A bladder assembly for forming a part made of a fiber-reinforced polymeric material, the bladder assembly comprising:
    a bladder comprising an interior having a hollow interior channel within the interior of the bladder;
    an intake port fluidically coupled with an exterior of the bladder and the interior of the bladder such that a fluid within the exterior of the bladder can flow into the interior of the bladder;
    an exhaust port fluidically coupled with the interior of the bladder and the exterior of the bladder such that the fluid within the interior of the bladder can flow out of the interior of the bladder;
    a first sensor fluidically coupled with the exterior of the bladder and configured to detect a first pressure of the fluid within the exterior of the bladder;
    a second sensor fluidically coupled with the interior of the bladder and configured to detect a second pressure of the fluid within the interior of the bladder; and
    a pressure control device operably coupled with the first sensor and the second sensor, fluidically coupled with the exhaust port and configured to control a pressure drop across the interior of the bladder from the intake port to the exhaust port in response to a difference between the first pressure and the second pressure.

2. The bladder assembly according to claim 1, wherein:
the bladder comprises a first end portion and a second end portion;
the first end portion and the second end portion define opposite ends of the hollow interior channel;
the bladder assembly further comprises an intake plug fixed to the first end portion of the bladder;
the intake port passes through the intake plug;
the bladder assembly further comprises an exhaust plug fixed to the second end portion of the bladder; and
the exhaust port passes through the exhaust plug.

3. The bladder assembly according to claim 2, wherein:
the intake port is fluidically coupled with the hollow interior channel of the interior of the bladder; and
the exhaust port is fluidically coupled with the hollow interior channel of the interior of the bladder.

4. The bladder assembly according to claim 2, wherein:
the bladder comprises at least an outer layer and an inner layer;
the inner layer defines the hollow interior channel;
the interior of the bladder has a fluid flow conduit interposed between the outer layer and the inner layer and extending from the first end portion of the bladder to the second end portion of the bladder;
the intake port is fluidically coupled with the fluid flow conduit; and
the exhaust port is fluidically coupled with the fluid flow conduit.

5. The bladder assembly according to claim 4, wherein:
the interior of the bladder has a plurality of fluid flow conduits, spaced apart from each other;
the intake port is fluidically coupled with the plurality of fluid flow conduits; and
the exhaust port is fluidically coupled with the plurality of fluid flow conduits.

6. The bladder assembly according to claim 1, wherein:
the bladder comprises a first end portion and a second end portion;
the first end portion and the second end portion define opposite ends of the hollow interior channel;
the bladder assembly further comprises an intake plug fixed to the first end portion of the bladder;
the second end portion is closed;
the intake port passes through the intake plug; and
the exhaust port passes through the intake plug.

7. The bladder assembly according to claim 6, further comprising a tube passing through the hollow interior channel from the first end portion of the bladder toward the second end portion of the bladder, wherein the tube is fluidically coupled with the intake port at the first end portion of the bladder and open to the hollow interior channel proximate the second end portion of the bladder.

8. The bladder assembly according to claim 6, wherein:
the bladder comprises at least an outer layer and an inner layer;
the inner layer defines the hollow interior channel;
the interior of the bladder has a fluid flow conduit interposed between the outer layer and the inner layer and extending from the first end portion of the bladder to the second end portion of the bladder;
the interior of the bladder has a second fluid flow conduit interposed between the outer layer and the inner layer and extending from the second end portion of the bladder to the first end portion of the bladder;
the fluid flow conduit and the second fluid flow conduit are fluidically coupled at the second end portion of the bladder;
the intake port is fluidically coupled with the fluid flow conduit; and
the exhaust port is fluidically coupled with the second fluid flow conduit.

9. The bladder assembly according to claim 8, wherein:
the fluid flow conduit extends along a first side of the bladder;
the second fluid flow conduit extends along a second side of the bladder; and
the first side is opposite the second side.

10. The bladder assembly according to claim 8, wherein:
the interior of the bladder has a plurality of fluid flow conduits, spaced apart from each other;
the interior of the bladder has a plurality of second fluid flow conduits, spaced apart from each other;
each one of the plurality of fluid flow conduits is fluidically coupled to a corresponding one of the plurality of second fluid flow conduits at the second end portion of the bladder;
the intake port is fluidically coupled with the plurality of fluid flow conduits; and
the exhaust port is fluidically coupled with the plurality of second fluid flow conduits.

11. The bladder assembly according to claim 1, wherein the pressure control device is configured to passively control the pressure drop across the interior of the bladder.

12. The bladder assembly according to claim 1, wherein the pressure control device is configured to actively control the pressure drop across the interior of the bladder.

13. The bladder assembly according to claim 1, wherein the pressure control device is further configured to limit the pressure drop across the interior to less than or equal to a pressure-drop percentage threshold.

14. The bladder assembly according to claim 13, wherein the pressure-drop percentage threshold is 5%.

15. A system for forming a part made of fiber-reinforced polymeric material, the system comprising:
an autoclave vessel defining an interior cavity and containing a fluid;
a bladder assembly at least partially in the interior cavity of the autoclave vessel, the bladder assembly comprising:
a bladder comprising an interior through which the fluid is flowable and having a hollow interior channel within the interior of the bladder;
an intake port fluidically coupled with the interior of the bladder and open to the interior cavity of the autoclave vessel;
an exhaust port fluidically coupled with the interior of the bladder and open to an exterior outside the interior cavity of the autoclave vessel; and
a pressure control device fluidically coupled with the exhaust port and configured to control a pressure drop across the interior of the bladder from the intake port to the exhaust port by regulating a flow of the fluid from the interior of the bladder to the exterior, wherein the fluid within the interior cavity of the autoclave vessel has a first pressure, the fluid within interior of the bladder has a second pressure lower than the first pressure, and the fluid in the exterior has a third pressure lower than the second pressure;
a first sensor fluidically coupled with the interior cavity of the autoclave vessel and configured to detect the first pressure;
a second sensor fluidically coupled with the interior of the bladder and configured to detect the second pressure; and a controller operably coupled with the first sensor, the second sensor, and the pressure control device, wherein the controller is configured to:
  compare the second pressure to the first pressure to provide a comparison between the second pressure and the first pressure; and
  control actuation of the pressure control device in response to the comparison between the second pressure and the first pressure.

16. The system according to claim 15, further comprising a first tool and a second tool between which the bladder is interposed, wherein:
  the first tool has a multi-part construction and comprises a first portion and a second portion;
  the first portion is adjoined to the second portion along a seam; and
  the bladder is located at the seam such that the bladder is interposed between the seam and the second tool.

17. A method of forming a part made of fiber-reinforced polymeric material, the method comprising:
  positioning a bladder of a bladder assembly within an interior space of the part, wherein the bladder comprises an interior having a hollow interior channel and wherein the bladder assembly further comprises:
    an intake port fluidically coupled with the interior of the bladder;
    an exhaust port fluidically coupled with the interior of the bladder; and
    a pressure control device fluidically coupled with the exhaust port and configured to control a pressure drop across the interior of the bladder from the intake port to the exhaust port;
  positioning the part and the bladder within an interior cavity of an autoclave vessel;
  while in the interior cavity of the autoclave vessel, shaping the interior space of the part with the bladder;
  while shaping the interior space of the part with the bladder, creating a pressure drop across the interior of the bladder, with the pressure control device, which is fluidically coupled with the interior of the bladder and an exterior outside the autoclave vessel, to induce flow of a fluid, contained within the autoclave vessel, through the interior of the bladder and from the interior of the bladder to the exterior outside the autoclave vessel;
  comparing a first pressure of the fluid within the autoclave vessel to a second pressure of the fluid within the interior of the bladder to provide a comparison between the first pressure and the second pressure, wherein the second pressure is lower than the first pressure; and
  controlling actuation of the pressure control device, to control the pressure drop across the interior of the bladder, in response to the comparison between the first pressure and the second pressure.

18. The method according to claim 17, wherein the fluid flows into the interior of the bladder from a first end portion of the bladder and flows out of the interior of the bladder to the exterior outside the autoclave vessel from a second end portion of the bladder.

19. The method according to claim 17, wherein the fluid flows into the interior of the bladder from a first end portion of the bladder and flows out of the interior of the bladder to the exterior outside the autoclave vessel from the first end portion of the bladder.

20. The method according to claim 17, wherein the fluid flows through the interior of the bladder between an inner layer of the bladder and an outer layer of the bladder.

* * * * *